United States Patent [19]

Orlandea et al.

[11] Patent Number: 4,475,775

[45] Date of Patent: Oct. 9, 1984

[54] BULLDOZER TRACK SUPPORT ROLLER ARRANGEMENT

[75] Inventors: Nicolae V. Orlandea, Davenport; Ray C. Huang, Bettendorf, both of Iowa; Bernard E. Romig, Illinois City; Jack C. Wiley, Moline, both of Ill.

[73] Assignee: Deere & Company, Moline, Ill.

[21] Appl. No.: 445,320

[22] Filed: Nov. 29, 1982

[51] Int. Cl.³ ............................................. B60D 55/14
[52] U.S. Cl. ........................................ 305/28; 305/25
[58] Field of Search ...................... 301/16, 17, 24, 25, 301/27, 28; 305/25, 28

[56] References Cited

U.S. PATENT DOCUMENTS

D. 190,803 7/1961 Schwartz et al. ..................... D14/3
1,926,244 9/1933 Sargent ............................. 305/24 X
3,948,331 4/1976 Esch ..................................... 305/28

Primary Examiner—David A. Scherbel

[57] ABSTRACT

A bulldozer has track support rollers arranged such that a line drawn through their lowermost points forms a curved line. This support roller arrangement is effective to minimize large pitch motions normally experienced during operation of conventional bulldozers having rollers arranged such that a straight line passes through the lowermost points thereof.

5 Claims, 6 Drawing Figures

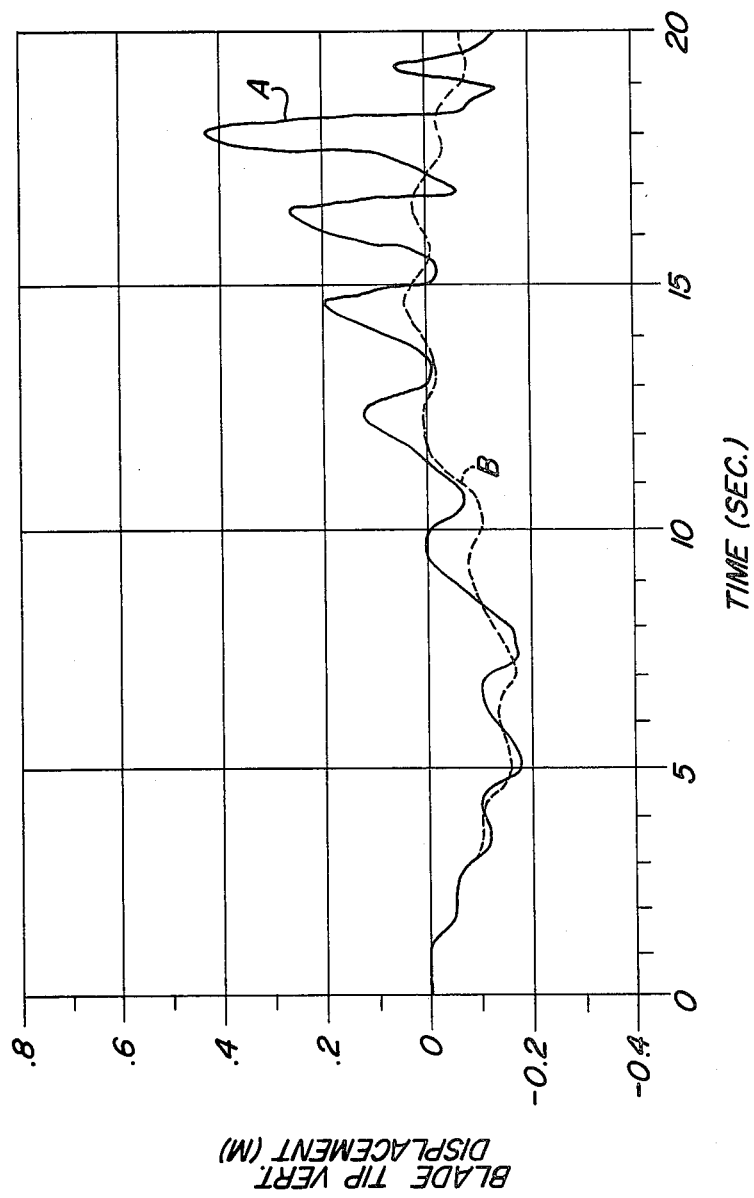

BULLDOZER TRACK SUPPORT ROLLER ARRANGEMENT

BACKGROUND OF THE INVENTION

The present invention relates to bulldozer undercarriage and more specifically relates to track support systems for such undercarriages.

Bulldozers are often operated to level or grade the ground surface. When so operating, the bulldozers quite often undergo large pitch motions which cause their blades to cut an undesirable wavy ground surface.

SUMMARY OF THE INVENTION

According to the present invention, there is provided an improved track support system for a bulldozer.

A broad object of the invention is to provide a bulldozer constructed such that during grading or leveling operations it undergoes only insignificant pitch motions.

A more specific object of the invention is to provide a bulldozer having its track supported such that it counteracts any tendency for the bulldozer to develop severe pitch motions during grading or leveling operations.

These and other objects are carried out by a track support structured in accordance with the present invention and including track support rollers located between the drive sprocket and idler wheel such that a line drawn through the lowermost points of the rollers arches upwardly with the high point of the arch being substantially directly below a horizontal axis passing through the center of gravity of the bulldozer.

BRIEF DESCRIPTION OF THE DRAWINGS

FIG. 4 is a graph showing a comparison between the vertical blade tip displacement, as a function of time, of a conventionally supported bulldozer and a bulldozer equipped with track rollers arranged in accordance with the present invention.

DESCRIPTION OF THE PREFERRED EMBODIMENT

Figure 1:
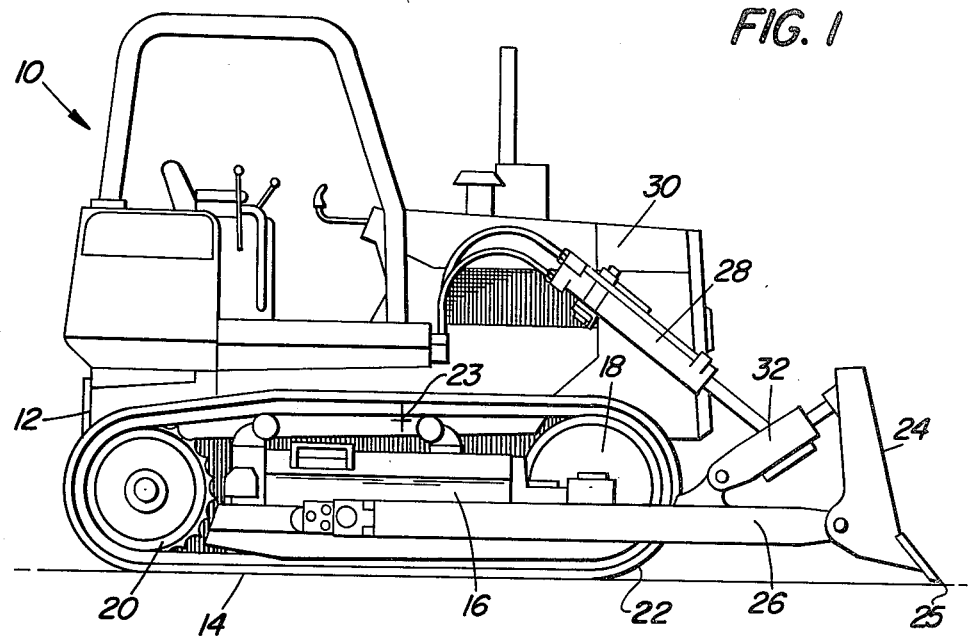
FIG. 1 is a side elevational view of a bulldozer of a type with which an undercarriage constructed in accordance with the present invention is particularly adapted for use.

Referring now to FIG. 1, therein is shown a crawler bulldozer 10 including a main frame 12 having track assemblies 14 (only one shown) coupled thereto and extending longitudinally along opposite sides thereof. Each track assembly 14 includes a longitudinal track frame 16 having an idler wheel 18 slidably supported on the forward end thereof, and supported from the main frame in fore-and-aft alignment with the idler wheel is a drive sprocket 20. A drive track 22 is entrained about the idler wheel 18 and the drive sprocket 20. A horizontal axis 23 passes through the center of gravity of the bulldozer. A dozer blade 24 having a cutting edge or tip 25 is vertically swingably mounted to the track frames by a pair of push arms 26 (only one shown), and a pair of hydraulic lift actuators 28 (only one shown) is coupled between an upstanding support 30 at the forward end of the bulldozer and the push arms for selectively raising and lowering the blade 24. A pair of hydraulic pitch actuators 32 (only one shown) are coupled between the push arms and the top of the blade for adjusting the latter about its connection with the push arms.

Figure 2:
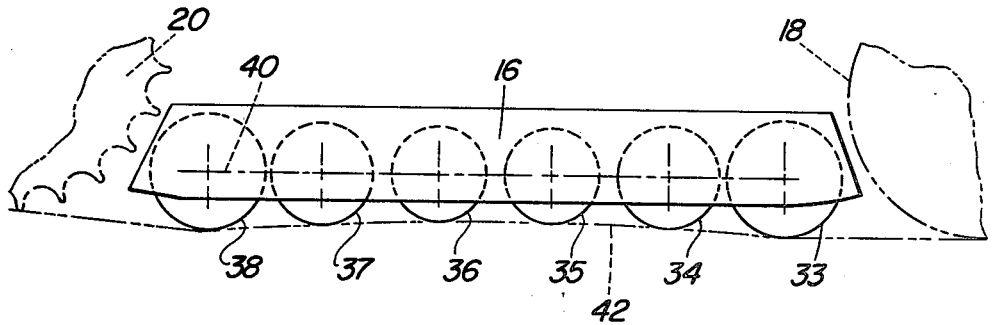
FIG. 2 is a side elevational view showing different sized track support rollers arranged such that a line drawn through their respective lowermost points is upwardly arched.

Referring now to FIG. 2, it can be seen that a plurality of track support rollers are rotatably supported at longitudinally spaced locations along the bottom of the track frame 16. Specifically, proceeding from front to rear there is provided a large roller 33, a medium sized roller 34 and a small roller 35 followed by rollers 36, 37 and 38 which are equal in size to the rollers 35, 34 and 33, respectively. All of the rollers have centers located on a line of centers 40. This arrangement of rollers is such that an upwardly curved line 42 passes through the lowermost points of the rollers. It is to be noted that the rollers are preferably located such that the high point of the line 42 is approximately vertically below the axis 23 which passes through the bulldozer's center of gravity.

Figure 3:
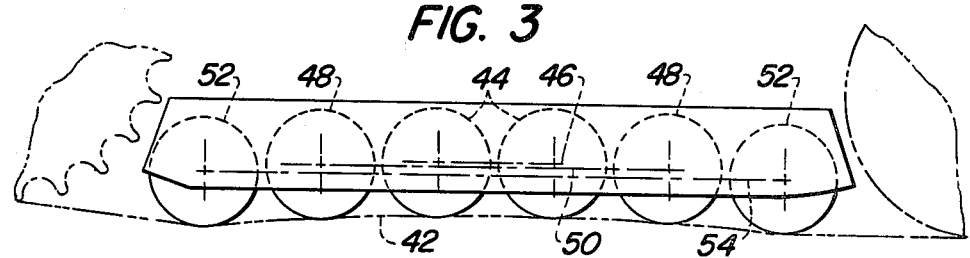
FIG. 3 is a side elevational view similar to FIG. 2 but showing equal-sized track support rollers.

FIG. 3 discloses a plurality of equal-sized rollers spaced equally from each other along the track but having their centers arranged such that the upwardly curved line 42 passes through the lowermost points of the rollers. Specifically, a central pair of rollers 44 is located on a first line of centers 46. A second pair of rollers 48 is respectively located on opposite sides of the first pair of rollers 46 on a line of centers 50 which is below the line of centers 46. A third pair of rollers 52 is respectively located between one of the pair of rollers 46 and the idler wheel 18 and between the other of the rollers 46 and the sprocket 20. The pair of rollers 52 is located on a line of centers 54 which is located below the line of centers 50.

The track roller arrangements of FIGS. 2 and 3 are functional equivalents of each other. Referring now to FIG. 4, therein is shown a graph which illustrates the effectiveness of the track roller arrangements disclosed in FIGS. 2 and 3 in reducing pitch motions in the bulldozer 10. Specifically, the graph plots blade tip vertical displacement in meters as a function of time in seconds beginning when an operator lowers the blade into the soil to be graded. Line A represents the vertical blade tip displacement of a bulldozer having a conventionally supported track constructed with its rollers arranged such that a straight line passes through the lowermost points thereof while line B represents the vertical blade tip displacement of a bulldozer having a track supported with rollers arranged like those in FIGS. 2 or 3. Beginning at 0 on the time axis, it can be seen that during approximately the first five seconds of operation, corresponding to the initial lowering of the blade into the ground, the lines A and B trace substantially identical paths. However, for the next thirteen seconds the blade pitch motion represented by the line A increases in amplitude while decreasing in period and thus becomes quite violent as compared to the blade pitch motions represented by the line B.

It will be understood, of course, that as the blade undergoes pitch motions the ground contour left by the blade will be wavy. As the tracks of the bulldozer pass over the high points or peaks of the waves, less than the full length of the track will sometimes be in contact with the ground resulting in the weight of the bulldozer being supported on less than the full number of track support rollers. Also, as the bulldozer falls or pitches forwardly after climbing a wave, there will be impact loading of some of the rollers. The more violent the pitch motion the greater the loading on some of the rollers will be.

Figure 5:
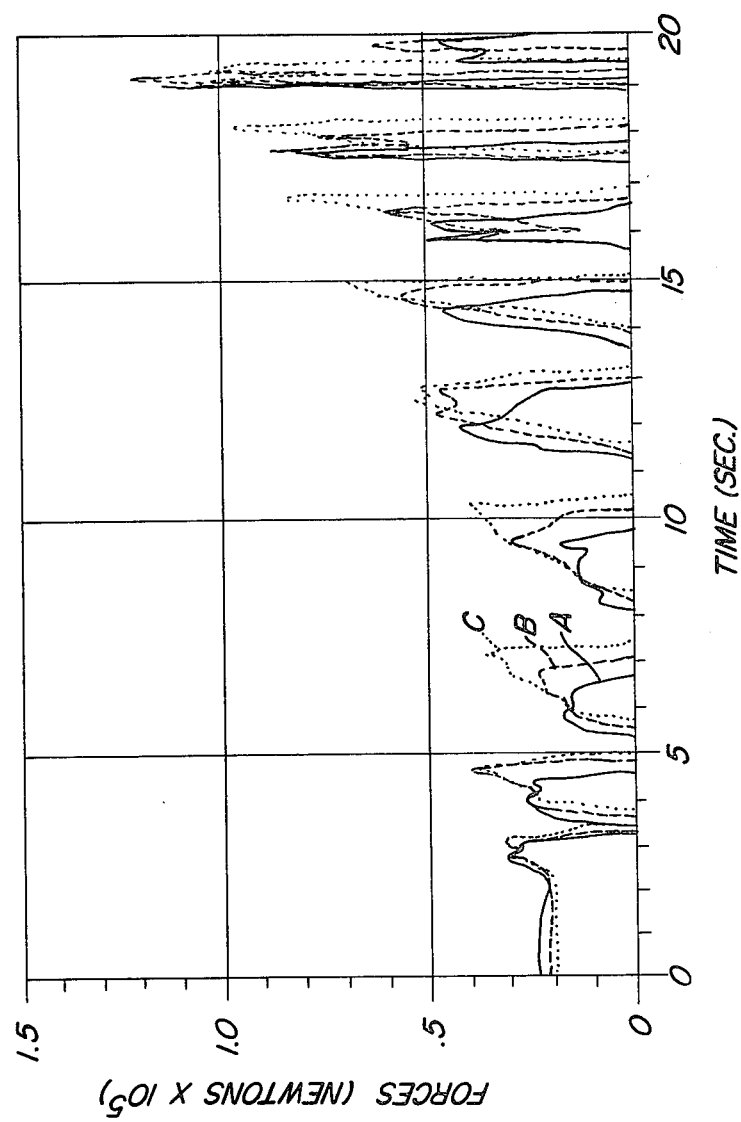
FIG. 5 is a graph showing the ground support forces occurring on three track rollers, as a function of time, of a conventionally supported bulldozer.
Figure 6:
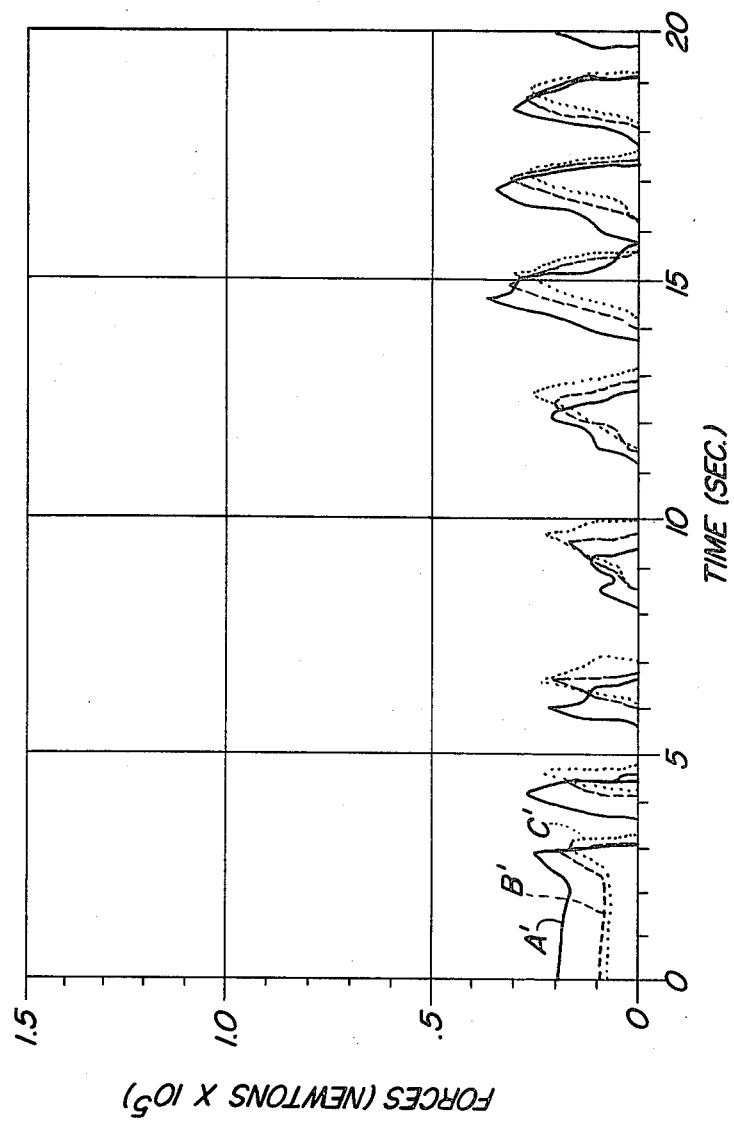
FIG. 6 is a graph similar to that of FIG. 5, but showing the ground support forces occurring on three track rollers arranged in accordance with the present invention.

This is made evident by inspecting the graphs depicted in FIGS. 5 and 6, which cover the same time frame covered by the graph depicted in FIG. 4 and show the ground support forces experienced at any given time by the second, third and fourth track support rollers, as considered from front the rear. The graph in FIG. 5 relates to a bulldozer having conventionally arranged track support rollers while the graph in FIG. 6 relates to a bulldozer having track support rollers arranged in accordance with the present invention as illustrated in either FIG. 2 or FIG. 3. Referring to FIG. 5, the lines A, B and C respectively represent the ground forces experienced by the second, third and fourth rollers, and it can be seen that the forces experienced by these rollers generally cycle through ever increasing peaks once the initial five seconds of operation have passed. The largest peak forces experienced by the second, third and fourth rollers occur between 18.5 and 19.5 seconds and are 1.13, 1.2 and $0.98 \times 10^5$ Newtons, respectively. As can be seen in FIG. 6, where the lines A', B' and C' respectively relate to the forces experienced by the second, third and fourth rollers, the largest peak forces experienced at any time by these rollers are 0.36, 0.32 and $0.31 \times 10^5$ Newtons, respectively. These forces are only about one-third, one-fourth and one-third of the largest peak forces respectively experienced by the conventionally arranged second, third and fourth track support rollers. Thus, with all other things being equal, the wear life of the track support rollers arranged as shown in either FIG. 2 or FIG. 3 would be greater than that of the conventionally arranged rollers.

We claim:

1. In a bulldozer including a longitudinally extending main frame, a dozer blade mounted for operation forwardly of the main frame, a pair of track assemblies coupled to and extending longitudinally at opposite sides of the main frame, each track assembly including a longitudinally extending track frame carrying an idler wheel at its forward end in alignment with a final drive sprocket mounted to the frame at a location adjacent the rearward end of the track frame, a plurality of track support rollers fixed relative to and mounted at spaced locations along the track frame, and an endless track being received about the idler wheel and sprocket, the improvement comprising: said rollers having lowermost points located on an arched line extending between a first to a last roller considered from one end to the other of the track frame.

2. The bulldozer defined in claim 1 wherein the rollers are of equal diameter and with some being mounted at different heights than other on said frame.

3. The bulldozer defined in claim 2 wherein the rollers are arranged such that an uppermost point on the arched line is located so as to be approximately vertically below a horizontal, transverse axis adapted to pass through the center of gravity of a bulldozer with which the support system is adapted for use.

4. The bulldozer defined in claim 1 wherein some of the rollers have diameters which are different from the others and wherein all of the rollers are mounted on the same line of centers.

5. The bulldozer defined in claim 4 wherein the rollers are arranged such that an uppermost point on the arched line is located so as to be approximately vertically below a horizontal transverse axis adapted to pass through the center of gravity of said bulldozer.

* * * * *